United States Patent [19]
Hazen

[11] 3,858,855
[45] Jan. 7, 1975

[54] FOOD PROCESSING VAT
[75] Inventor: Gretz L. Hazen, Fort Atkinson, Wis.
[73] Assignee: DEC International, Inc., Madison, Wis.
[22] Filed: Nov. 17, 1972
[21] Appl. No.: 307,379

[52] U.S. Cl................................. 259/104, 99/462
[51] Int. Cl.............................................. B01f 7/32
[58] Field of Search ............ 99/463, 462, 461, 460, 99/479, 477, 459, 458, 456; 259/DIG. 7, DIG. 10, DIG. 21, 104, 182; 15/246.5

[56] References Cited
UNITED STATES PATENTS
| | | | |
|---|---|---|---|
| 1,266,670 | 5/1918 | Fisher | 99/458 |
| 3,193,929 | 7/1965 | Collins | 99/461 |
| 3,541,687 | 11/1970 | Peters | 99/459 X |

FOREIGN PATENTS OR APPLICATIONS
| | | | |
|---|---|---|---|
| 1,030,839 | 3/1953 | France | 259/104 |
| 1,312,501 | 11/1962 | France | 99/461 |
| 31,996 | 7/1923 | Denmark | 259/104 |

Primary Examiner—Harvey C. Hornsby
Assistant Examiner—Alan Cantor
Attorney, Agent, or Firm—Andrus, Sceales, Starke & Sawall

[57] ABSTRACT

A food processing vat comprising a closed vessel that includes a pair of partially cylindrical, intersecting sections. A vertical shaft is disposed centrally within each vat section and the distance between the shafts is slightly greater than the radius of the cylindrical sections. Each shaft carries an agitator frame that extends radially outward from the shaft, and a series of vertical blades are mounted on each frame and are designed so that when the shaft is rotated in one direction the blades act to stir the food product and when the shaft is rotated in the opposite direction, the blades act to cut or slice the food product.

13 Claims, 14 Drawing Figures

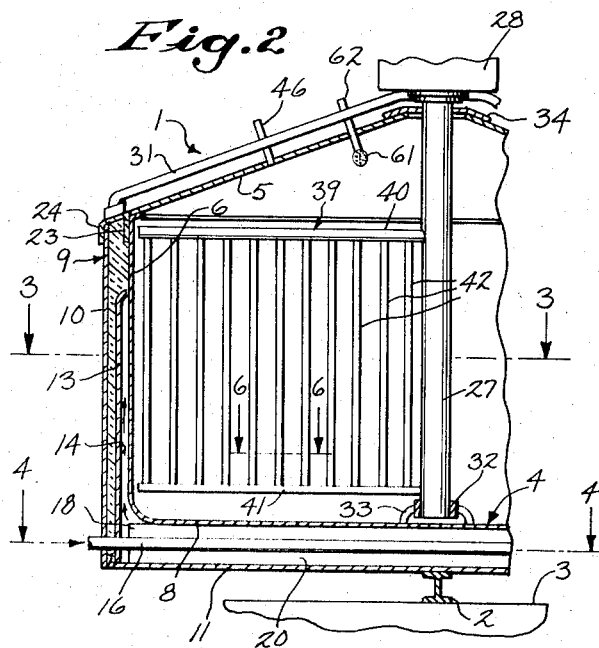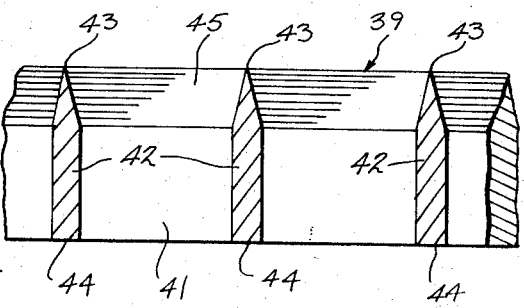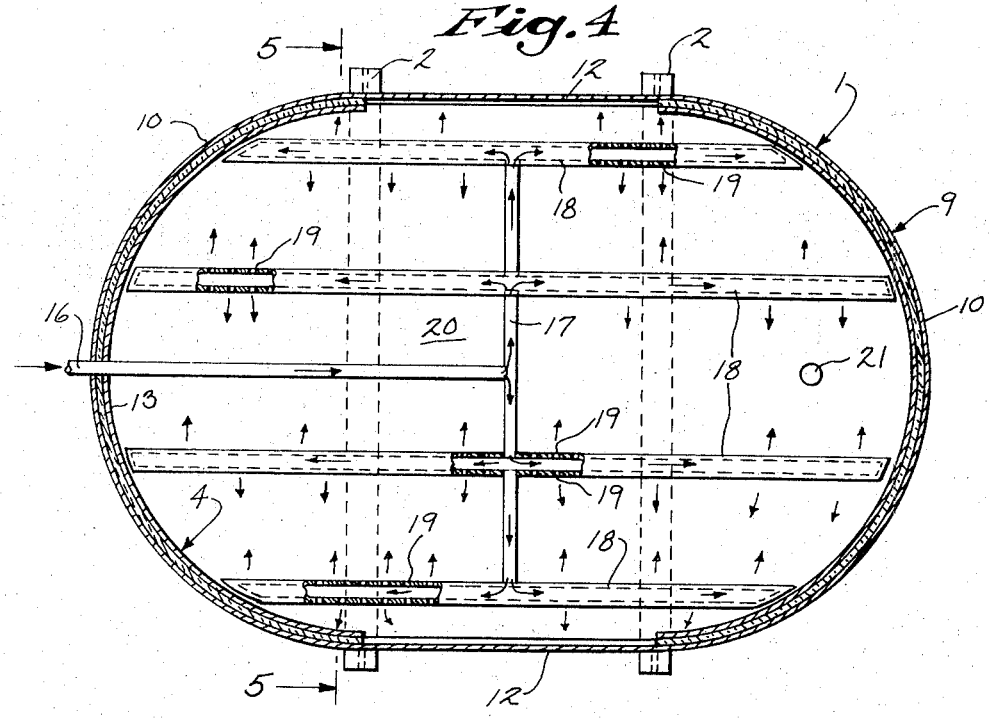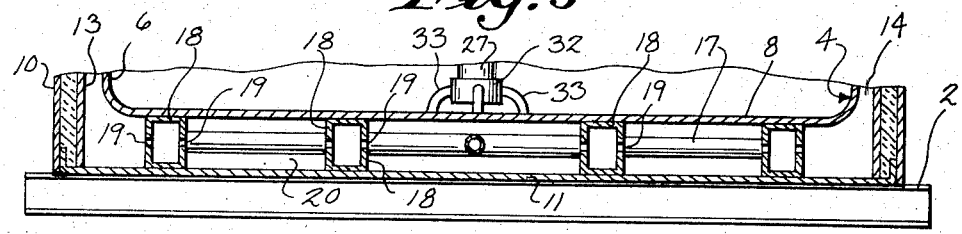

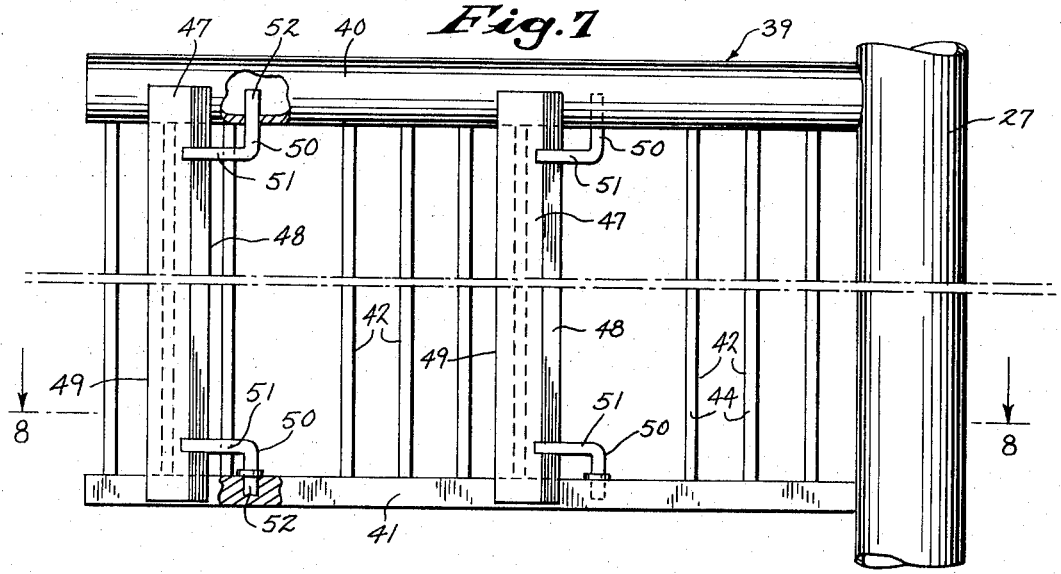
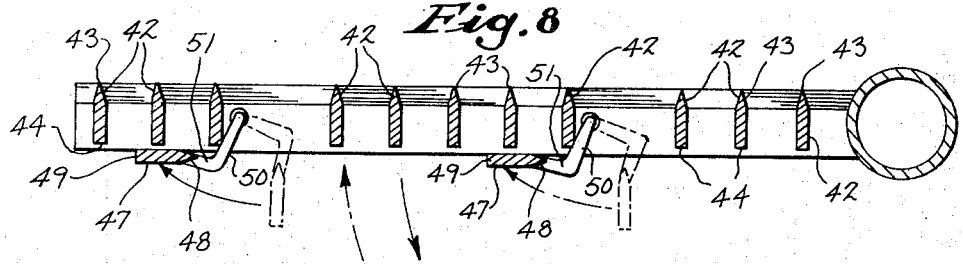
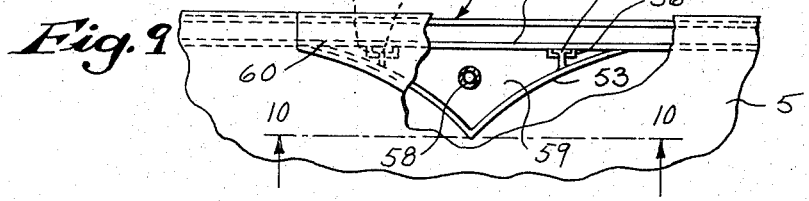
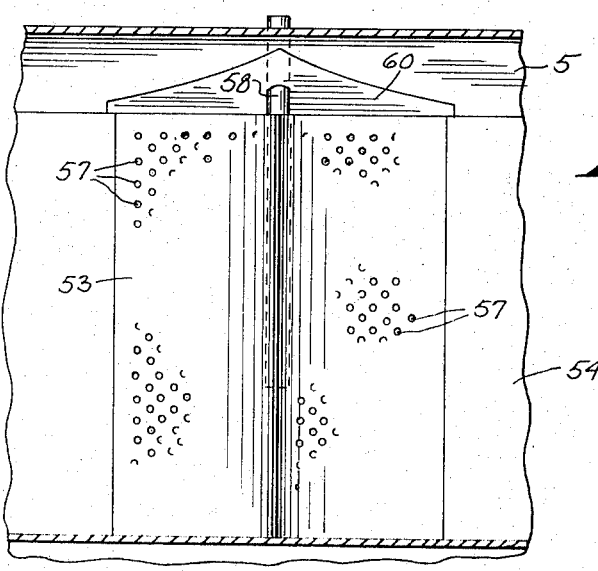

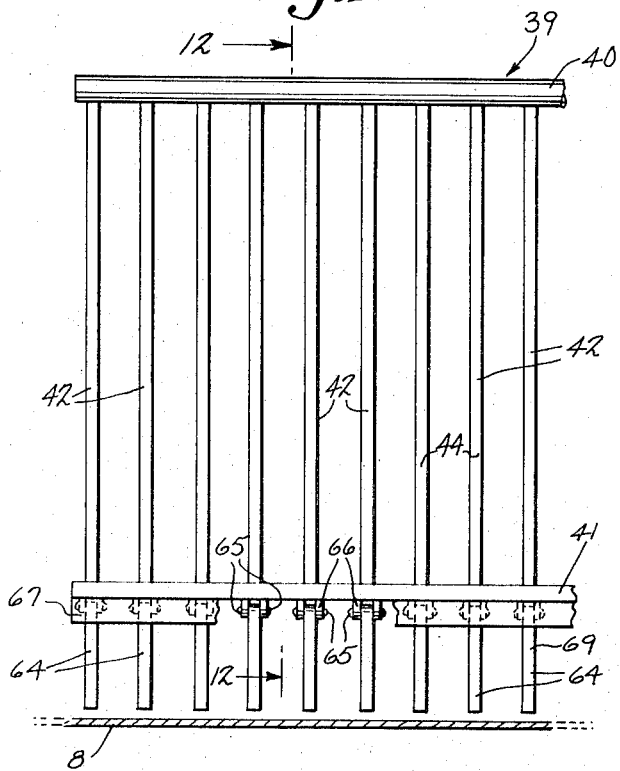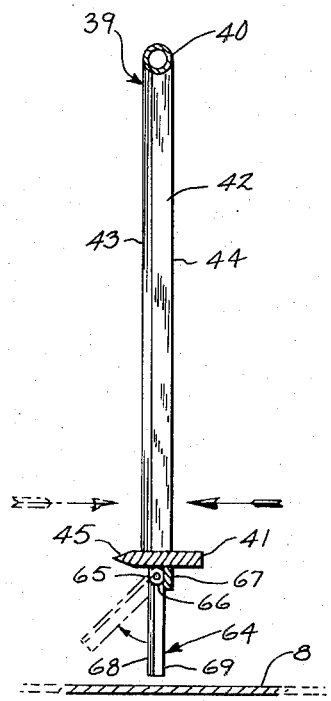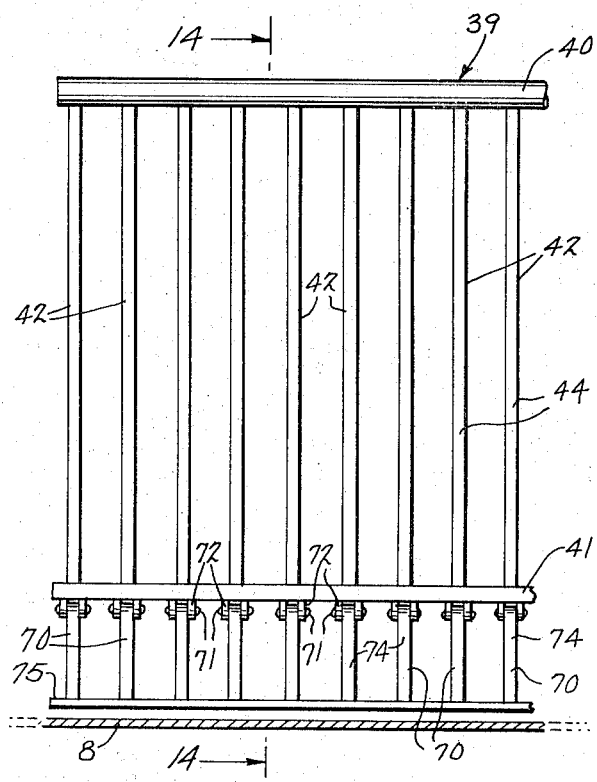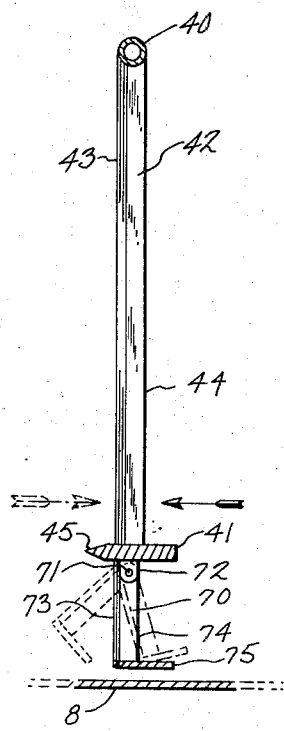

FOOD PROCESSING VAT

BACKGROUND OF THE INVENTION

In the conventional cheese making process for making cheddar, colby, or other similar types of cheese, milk is introduced into the cheese making vat along with rennet and a starter. After the materials have been thoroughly blended or mixed, the agitation is stopped which results in the coagulation or gelling of the curd. When the product reaches a given consistency, the curd is then cut into cubes by use of cutter blades. The curds are then slowly stirred by agitator blades or baffles while cooking to firm up the curd and draw out the whey.

In the past cheese making has been normally carried out in large open-top vats. Open-top vats are not a sanitary design, for it is possible that foreign material can fall into the vat, and contamination such as bacteriaphage is possible. As a further disadvantage, when the product is heated in an open top vat, drying can occur on the walls of the vat, and the dried residue must be manually scrubbed from the vat after the cheese making operation. The scrubbing is an abrasive action which tends to roughen the interior surface of the vat, thereby increasing the tendency for the product to adhere to the vat surface.

Because of the problems encountered with the open-top vat, there has recently been increased activity in closed cheese making vats. Vertical cheese making vats, such as that disclosed in U.S. Pat. No. 3,541,687, provide a more sanitary design which decreases contamination. As a further advantage, the closed vat reduces the necessary floor space and permits maximum use of automatic controls and thereby results in better control of product quality.

While the conventional closed vat provides a more sanitary design that an open-top vat, the conventional closed vat is not sealed to the atmosphere during the entire cheese making operation, for it normally is necessary to insert and remove various types of implements, such as baffles, agitators, cutters, and the like which periodically expose the product to the atmosphere.

SUMMARY OF THE INVENTION

The present invention is directed to a sealed cheese making vat which minimizes contamination of the product and eliminates the necessity of utilizing different types of implements during the cheese making operation. The cheese making vat is a closed vessel composed of a pair of partially cylindrical, intersecting wall sections which provide the vat with a figure-8 shape. A vertical shaft is disposed centrally within each vat section and the distance between the shafts is slightly greater than the radius of each of the vat sections. Each vertical shaft carries an agitator and cutting frame which extends radially outward from the shaft and a series of vertical blades are mounted on each frame. The blades are designed so that when the shaft is rotated in one direction, the blades act to stir the product, and when rotated in the opposite direction, provide a minimum frontal area and act to cut or slice the curd. More specifically, in one form of the invention, the blades are provided with sharpened edges on one side and blunt edges on the opposite side. When the shafts are rotated in a manner so that the sharpened edges are leading, the curd will be cut, while when the shaft is rotated in the opposite direction so that the blunt edges are leading, a stirring action is provided.

In another form of the invention, the blades are pivotally mounted to the frame in a manner so that the sharpened edges of the blades are leading when the shaft is rotated in one direction, and the blades automatically pivot to present a broad surface to the direction of movement when the shaft is rotated in the opposite direction.

The cheese making vat of the invention is a closed unit which can be sealed to the atmosphere during the entire cheese making operation to thereby minimize contamination of the product. Furthermore, the same implements which are permanently mounted on the shaft are utilized for both the stirring and cutting operations and it is not necessary to remove and replace the implements during the cheese making operation. By utilizing the same implements for both stirring and cutting the overall cost of the unit is reduced, as well as reducing the labor necessary for installation and remove of the various implements.

The cheese making vat lends itself to automation in that it can be sealed and through automatic control can be programmed through the entire cheese making cycle without the necessity of opening the vat and exposing the product to the atmosphere. As a further advantage, the vat can be cleaned in place after the cheese making operation, and due to the fact that the unit is sealed during operation, there is no tendency for the product to dry and adhere on the walls of the vat.

The unit is free standing and can be readily mounted on any supporting floor or foundation and it is not necessary to reconstruct the building in order to mount the unit, as is necessary with some types of vertical cheese making vats.

Other objects and advantages will appear in the course of the following description.

DESCRIPTION OF THE DRAWINGS

The drawings illustrate the best mode presently contemplated of carrying out the invention.

In the drawings:

FIG. 2 is a vertical section taken along line 2—2 of FIG. 1;

FIG. 4 is a horizontal section taken along line 4—4 of FIG. 2;

FIG. 5 is a transverse section taken along line 5—5 of FIG. 4;

FIG. 6 is a section taken along line 6—6 of FIG. 2, and showing the construction of a blade;

FIG. 7 is a view similar to FIG. 2, showing the use of a pivotable type of blade in conjunction with a fixed blade;

FIG. 8 is a view taken along line 8—8 of FIG. 7;

FIG. 9 is a fragmentary plan view showing the use of removable, perforated, V-shaped inserts with the vat;

FIG. 10 is a view taken along line 10—10 of FIG. 9;

FIG. 11 is an enlarged side elevation of a modified form of the invention in which pivotable blade sections are attached to the lower end of the rotating frame;

FIG. 12 is a view taken along line 12—12 of FIG. 11;

FIG. 13 is a view similar to FIG. 11 showing another embodiment of the invention utilizing a modified form of pivoting blade on the frame; and FIG. 14 is a view taken along line 14—14 of FIG. 13.

DESCRIPTION OF THE PREFERRED EMBODIMENT

The drawings illustrate a cheese making vat 1 which can be used for making various types of cheese, such as cheddar, Swiss, colby, granulated, Italian, and the like. The vat 1 is supported on a series of I-beams 2 which rest on a suitable floor or foundation 3.

Figure 1:
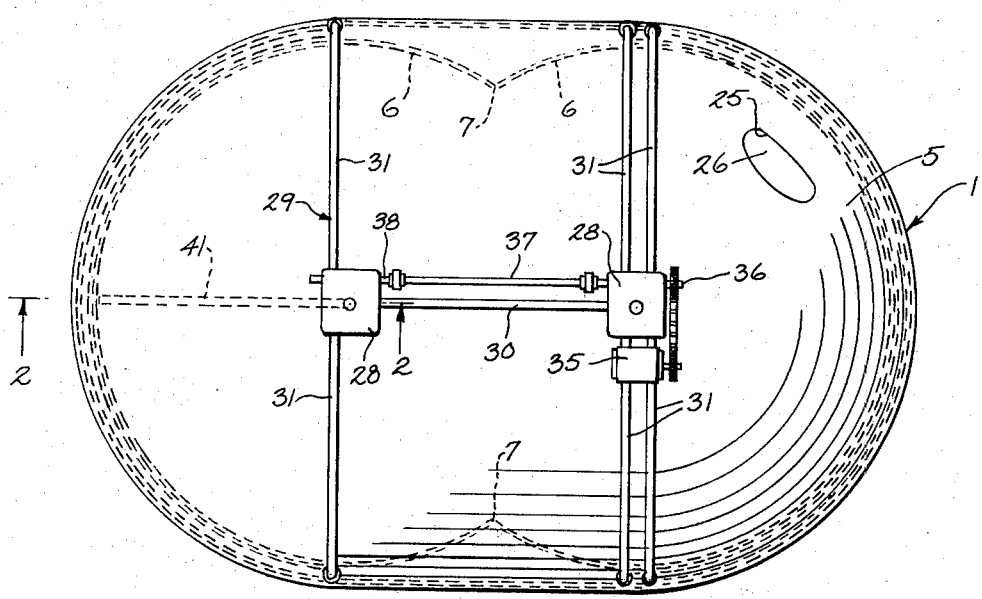
FIG. 1 is a top view of the cheese making vat of the invention.
Figure 3:
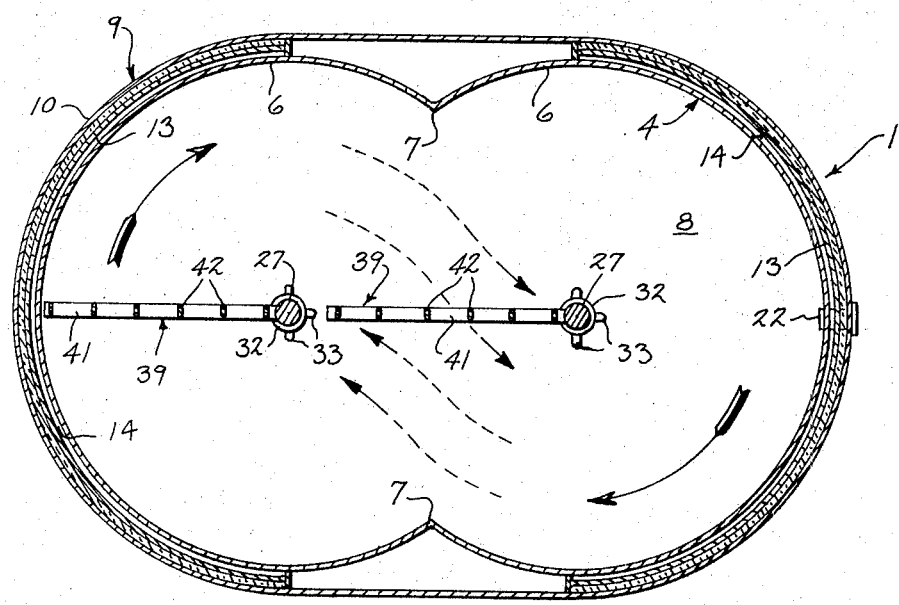
FIG. 3 is a section taken along line 3—3 of FIG. 2.

The vat 1 includes an inner open-top shell 4 made of stainless steel or other corrosion resistant material and which is adapted to contain the curds and whey, or other food product. A cover 5 encloses the top of the shell. As best shown in FIG. 1, the inner shell 4 is composed of a pair of partially cylindrical, intersecting, vertical wall sections 6 that are joined together along vertical ridges or joints 7 which are located diametrically opposite each other. With this construction, the inner shell 4 has a figure-8 shape composed of a pair of end chambers which are joined together by a waist of reduced width. A generally flat bottom wall 8 is joined to the lower edges of the vertical wall sections 6.

Vat 1 also includes an outer shell 9 formed of stainless steel, or other corrosion resistant material. The outer shell 9 is composed of a vertical wall 10, which is located outwardly of the wall sections 6 and a bottom wall 11 that is spaced beneath the bottom wall 8 of inner shell 4. The vertical wall 10 is formed of a pair of generally straight, parallel wall sections 12 which are joined at their ends by curved sections. An interior wall 13 is spaced between the inner wall section 6 and the outer wall section 10 and defines a heating chamber 14. As best shown in FIG. 2, the upper edge of the wall 13 is bent inwardly and is secured to the wall section 6, while the lower edge of the interior wall 13 is secured to the lower portion of wall section 10.

To supply heat to the food product contained within the vat, an inlet line 16 which is connected to a source of steam or other heating medium, extends within the space between the bottom walls 8 and 11, and the inner end of the line 16 is connected to the central portion of a cross pipe 17. Cross pipe 17 extends through a series of generally rectangular tubes 18 which extend longitudinally of the vat, and the cross pipe 17 is provided with suitable openings through which the steam is conducted from the cross pipe into the tubes 18.

Each tube 18 is provided with a series of holes 19 that are spaced along the length of the tube and the steam is adapted to pass through the holes 19 into the compartment or space 20 located between the bottom walls 8 and 11. As the side wall compartment 14 communicates with the compartment 20, the steam or other heating medium will be in heat transfer relation with both the bottom wall 8 and the major portion of the side walls 6 of the inner shell to thereby heat the cheese curd or other food product.

Condensate can be drained from the compartment 20 through a suitable drain 21.

The product can be drained from the inner shell 4 through a drain 22. As the bottom wall 8 is flat or horizontal, the drainage, through the line 22 can be facilitated by providing a mechanism, not shown, which will elevate or tip the vat toward the drain 22.

The tent-shaped cover 5 which encloses the upper end of the inner shell 4 is provided with a pair of spaced, downwardly extending flanges 23 and 24. The inner flange 23 is welded or otherwise secured to the wall sections 6 of the inner shell 5, while the outer flange 24 is welded to the wall 10 of the outer shell 9.

To provide access to the interior of the vat, a manhole 25 is formed in the cover 5 and is adapted to be enclosed by a cover 26. The manhole construction is conventional, and the cover 26 is provided with a sealing gasket so that when the cover is in place, the interior of the vat is completely sealed to the atmosphere.

A vertical shaft 27 is disposed centrally within each of the cylindrical wall sections 6 of the inner shell 4. Each shaft 27 is suspended from a gear box 28 which is mounted on a supporting framework 29 secured to cover 5. Framework 29 comprises a support 30 that extends along the ridge of the cover, and a series of legs 31 extend downwardly from the support 30 along the cover and are secured to the peripheral edge of the cover. As the shafts 27 are suspended from the respective gear boxes it is not necessary to provide a thrust bearing for the lower ends of the shafts. However, to resist side deflection the lower end of each shaft 27 is journalled within a nylon bushing that is supported by a ring 32 mounted above bottom wall 8 by legs 33. To provide a seal between each shaft 27 and the cover 5 an annular sealing member 34 is secured to the cover bordering the opening through which the shaft extends and is adapted to engage the shaft and provide an airtight seal.

The shafts 27 are driven in synchronization by a reversible motor 35 which is mounted on the framework 29. Motor 35 operates through a variable speed drive to drive the input shaft 36 of one of the gear boxes or speed reducing transmissions 28. The gear box is provided with a pair of output shafts, one of which is coupled to the respective vertical agitator shaft 27, and the other is connected by a shaft 37 to the input shaft 38 of the other gear box or transmission 28. With this drive mechanism the motor 35 acts to drive both of the shafts 27 through the respective gear boxes 28.

In accordance with the invention, an agitator and cutting frame 39 is secured to each of the shafts 27 and extends radially outward from the shaft to a location adjacent the respective cylindrical wall section 6. Each frame 39 includes a pair of horizontal frame members 40 and 41, and a series of vertical blades 42 extend between the frame members. As best illustrated in FIG. 6, each of the blades 42 is provided with a vertical sharp edge 43 and an opposite blunt edge 44.

The upper frame member 40 has a generally circular cross-section and is normally located above the level of the product contained within the vat, while the lower frame member 41 is in the form of a generally flat plate having a sharpened edge indicated by 45.

When the shafts 27 are rotated in the direction of the solid arrows in FIG. 2, the sharp edges 43 of the blades 42 will be leading and during the initial cutting action the blades will cut the mass of curd into a series of concentric cylinders. As the blades 42 of one cutting frame 39 move into the cutting path inscribed by the blades of the other cutting frame, the concentric cylinders of curd will be cut into long vertical strips. The strips of curd eventually topple over and are cut by the rotating blades into cube-like chunks.

After cutting, the curds are slowly agitated during cooking and the agitation is provided by reversing the rotation of the shafts 27 so that the blunt edges 44 of the blades 42 will be leading and this provides a greater frontal surface area to achieve the desired stirring or agitation for the curd.

The flow path of the product in the vat is illustrated by the dashed arrows in FIG. 1. Due to the presence of the V-shaped ridges 7 at the junction between the two cylindrical wall sections 6, the product being discharged from one chamber will be directed toward the shaft 27 of the other chamber, with the result that there is agitation throughout the entire area of each of the chambers, thereby eliminating dead spots in the pattern.

The blades 42 are permanently attached to the frames 39 and it is not necessary to remove or insert different blades or implements during the cheese making operation. Thus, it is a unique feature of the invention that the same implements can be utilized for both the stirring and cutting operations.

By eliminating the necessity of opening the vat to remove and replace implements, the vat can be retained in a sealed condition to minimize contamination. To further insure sanitary and non-contaminating conditions, an inert gas or sterilized air can be introduced into the upper end of the vat through a line 46 connected in the cover 5. The use of the inert or non-oxidizing atmosphere will further reduce the possibility of contamination of the product.

FIGS. 7 and 8 illustrate a modified form of the blade construction in which a movable type of blade 47 is used in conjunction with the fixed vertical blades 42. Each blade 47 is similar in construction to the blades 42, having a sharpened vertical edge 48 and an opposite blunt edge 49.

The blades 47 are pivotally connected to the frame members 40 and 41 by means of L-shaped arms 50. The horizontal end 51 of each arm is welded or otherwise secured to the sharpened edge 48 of the blade 47, while the vertical end 52 of each arm 50 is rotatably received within a hole in the frame member Engagement of the vertical ends 52 with the holes in the frame members 40 and 41 provides a pivotal attachment for the blades 47 to the frame 39.

When the shaft 27 and frame 39 are rotated in the direction of the dashed arrow in FIG. 8, the blades 47 will freely pivot rearwardly to the dashed position shown in FIG. 8, wherein the sharpened edges 48 of the blades will be leading and this provides a cutting action. When the direction of rotation is reversed, as shown by the full-line arrow in FIG. 8, the blades 47 will pivot to the position shown by the full lines in FIG. 8, in which position the broad side surface of each blade 47 will be disposed normal to the direction of movement of the frame 39. By providing a broad frontal surface an increased agitating or stirring effect is achieved. Thus, the blades 47, as illustrated in FIGS. 7 and 8, will automatically move or pivot from a stirring to a cutting position depending on the direction of rotation of the shaft 27 and frame 39.

In the stirring position, as illustrated in FIG. 7, the upper and lower ends of the blades 47 bear against the frame members 40 and 41, respectively, to provide a stop and limit the pivotal movement of the blades.

FIGS. 9 and 10 illustrate another modified form of the invention in which separate generally V-shaped inserts 53 are utilized in conjunction with the inner shell to provide the figure-8 configuration for the vessel. As shown in FIG. 9, the side walls 54 of the inner shell, which corresponds generally to inner shell 4 of the first embodiment, are straight and the inserts 53 are removably mounted on the central portions of the side walls 54 to provide the figure-8 configuration by means of vertical T-shaped guide bars 55 that are connected to the rear surface of each insert and are adapted to slidably engage guideways 56 on wall 54. Engagement of the guides 55 with the guideways 56 will lock the inserts 53 in position within the inner shell and yet will enable the inserts to be removed vertically from the vat.

As shown in FIG. 10, the inserts 53 are provided with a series of holes or perforations 57 and a dip tube 58 is disposed within the chamber 59 between the insert and the wall 54. During the manufacture of Swiss or similar types of cheese, it is desirable to pre-drain a portion of the whey from the vat. With the construction shown in FIGS. 9 and 10, the whey will pass through the perforations 57 into chamber 59 and can be withdrawn from the vat through the dip tube 58. If it is not desired to utilize the pre-drawing operation, a solid wall insert can be substituted for the perforated insert 53.

In the structure illustrated in FIGS. 9 and 10, the cover 5 is provided with an opening located above the insert 53 so that the insert can be installed and removed from the vat. The opening is normally enclosed by a sealed lid 60, and the dip tube 61 extends in sealed relation through an aperture in the lid.

The vat 1 is adapted to be cleaned-in-place after the cheese making operation by means of a pair of spherical nozzles 61 which are mounted beneath the cover 5, and conduits 62 connect the nozzles to a supply of washing solution. Each of the nozzles is provided with a plurality of outlets or jets 63 which direct the washing solution to all portions of the interior of the vessel. The washing solution being discharged from the nozzles 61 will not only clean the interior surface of the vat, but will also clean the blades 42, frame 39, and shafts 27 located within the vat.

FIGS. 11 and 12 illustrate a further modified form of the invention in which a series of pivoting blade sections are located beneath the frame 39. When using a pre-draw procedure, the shafts 27 are stopped which permits the curd to settle and after several minutes the curd will settle or matt in heavy chunks in the lower end of the vat. After the desired portion of the whey is predrawn from the vat, the curd is heavily matted and the construction shown in FIGS. 11 and 12 aids in loosening the matted curd from the bottom of the vat when the shafts 27 are again operated. As shown in FIGS. 11 and 12, a series of blades 64 are pivotably attached by pins 65 to lugs 66 which are carried by the lower surface of the frame member 41. A stop 67 is secured to the frame member 41 and limits the rearward movement of each blade 64. Each blade 64 is provided with a sharp vertical edge 68 and an opposite blunt edge 69. When the shafts 27 are rotated in a manner so that the sharp edges 43 of blades 42 and the sharp edges 68 of blade 64 are leading, as shown by the solid arrow in FIG. 12, the pressure of the curd will urge the blades 64 against the stop 67 and the stops will prevent the blades from pivoting beyond a vertical position. When rotated in this manner the sharp edges 68 of the blades 64 will act to cut or loosen the matted curd in the lower end of the vat.

When the shafts 27 are rotated in the opposite direction after the predrawing operations, as shown by the dashed arrow in FIG. 12, the blades 64 will pivot to the position shown in the dashed lines and tend to drag through the curd as the frame moves in the agitating direction. If the lower blades 64 were fixed so that they did not pivot upwardly when the shaft 27 was rotated in the agitating direction there would be excessive drag and load on the motor and the blunt edges 69 would tend to push the chunks of curd ahead of the blades rather than providing an agitating action.

FIGS. 13 and 14 illustrate another modified form of the invention using a different form of pivoting blades. As shown in FIGS. 13 and 14, a series of blades 70 are pivotally attached by pins 71 to lugs 72 on the lower frame member 41. Each of the blades 70 is provided with a sharp edge 73 which is generally in alignment with the sharp edges 43 of blades 42 and an opposite blunt edge 74.

Secured to the lower ends of the blades 70 is a generally flat plate 75 which extends the length of the frame 39. When the shafts 27 are rotated in a manner to provide a cutting action, as shown by the solid arrow in FIG. 14, the blades 70 will pivot opposite to the direction of rotation of the frame 39. As the blades pivot the pressure of the curd on the plate 75 acts as an air foil to maintain the blades 70 at a slight rearward angle to the vertical.

After several revolutions to cut the matted curd, the rotation of the shaft 27 is reversed to provide a stirring action. In the stirring action the frame 39 is rotated in the direction of the dashed arrow, as illustrated in FIG. 14, and the blades 70 and the attached plate 75 will pivot opposite to the direction of rotation of the frame 39. In this position the pressure of the curd on the plate 75 will act to pivot the blades 70 upwardly away from the vertical position and provide an increased frontal surface area for stirring.

The pivotable lower blades, as illustrated in FIGS. 11–15 are helpful in loosening the matted curd which has settled to the bottom of the vat after the predrawing operation. In the cutting operation the blades will be in a relatively vertical position and slice through or loosen the matted curd. On opposite rotation, the blades will pivot upwardly so that the blades will stir the curd and not push large chunks of the curd along the bottom of the vat.

The cheese making vat of the invention is a closed unit which can be sealed to the atmosphere to prevent contamination of the product. Permanently installed blades 43 and 47 are utilized for both the stirring and cutting operations and therefore, it is not necessary to open the vat to remove and substitute various types of implements during the cheese making operation. This not only eliminates the labor required for the replacement of implements, but also insures the sealed condition of the vat. Furthermore, by eliminating the use of the common cheese making implements the cleaning operation is simplified in that it is not necessary to separately clean the cheese making implements for the blades are readily cleaned by clean-in-place techniques.

The figure-8 configuration of the vessel acts to disrupt circular flow and thus provides a flow pattern which eliminates dead spots, thereby resulting in more effective agitation.

Various modes of carrying out the invention are contemplated as being within the scope of the following claims particularly pointing out and distinctly claiming the subject matter which is regarded as the invention.

I claim:

1. An apparatus for processing a food product, comprising a substantially sealed vessel to contain the product and including a pair of partially cylindrical intersecting vertical wall sections which define a pair of communicating partially cylindrical chambers, the distance between the axes of said chambers being slightly greater than the radii of the chambers said vessel also including a bottom wall secured to the lower edges of the vertical wall sections and a cover secured to the upper edges of the vertical wall sections, a vertical shaft disposed centrally of each chamber, a frame connected to each shaft and extending outwardly from the shaft, reversible drive means carried by the cover and operably connected to each shaft, and a series of blades carried by each frame, said blades being arranged so that when the respective shaft is rotated in one direction, the blades act to stir the product contained within the chambers and when the shaft is rotated in the opposite direction the blades act to cut the product contained within the chambers, at least one of said blades being movably mounted with respect to the frame and having a relatively sharp vertical edge and a relatively broad vertically extending surface, said movable blade being movable from from a position in which the broad surface leads in the direction of rotation when the shaft is rotated in the first direction to provide a stirring action for the product to a second position in which the sharp edge leads in the direction of rotation as the shaft is rotated in the opposite direction to provide a cutting action for the product.

2. The apparatus of claim 1, and including a pair of arms connected to each blade, and means for pivotally connecting each arm to the frame in a manner whereby the blades will automatically pivot between said first and second position in accordance with the direction of rotation of the respective shaft.

3. A vat for processing a product, comprising a vessel to contain the product, a vertical shaft disposed within the vessel, a frame connected to the shaft and extending outwardly from the shaft, reversible drive means for rotating the shaft, implement means carried by the frame, said implement means arranged so that when the shaft is rotated in one direction the implement means acts to stir the product and when the shaft is rotated in the opposite direction the implement means acts to slice the product, said implement means comprising at least one blade movably mounted with respect to the frame, said blade being provided with a relatively sharp vertical edge and a relatively broad vertically extending surface, said blade being movable from a first position in which the broad surface leads in the direction of rotation when the shaft is rotated in the first direction to provide a stirring action for the product, to a second position in which the sharp edge leads in the direction of rotation as the shaft is rotated in said opposite direction to provide a cutting action for the product.

4. The vat of claim 3, and including a pair of arms connected to said blade, and means for pivotally connecting each arm to the frame in a manner whereby the blades will automatically pivot between said first and second position in accordance with the direction of rotation of the respective shaft.

5. The vat of claim 4, wherein the arms are connected to said sharp edge of the blade and said arms extend in said first direction from the frame whereby the arms and the blade will freely trail from the frame when said shaft is rotated in said opposite direction.

6. The vat of claim 3, and including second implement means connected to the frame and located adjacent the bottom of the vessel, said second implement means comprising a series of generally vertical blade members pivotally connected at their upper ends to said frame, said second blade members disposed to slice the product when the shaft is rotated in said opposite direction and disposed to pivot relative to the frame when the shaft is rotated in said first named direction.

7. The vat of claim 3, wherein said frame includes a horizontal frame member attached to the lower end of said blade, said horizontal frame member having a relatively sharp edge facing in the same direction as the sharp vertical edge of said blade.

8. A vat for processing a product comprising a vessel to contain the product, a vertical shaft disposed within the vessel, a frame connected to the shaft and extending outwardly from the shaft, reversible drive means for rotating the shaft, implement means carried by the frame, said implement means arranged so that when the shaft is rotated in one direction the implement means acts to stir the product and when the shaft is rotated in the opposite direction, the implement means acts to slice the product, and second implement means carried by the frame and located adjacent the bottom of the vessel, said second implement means comprising a series of blade members pivotally connected along an edge to said frame and disposed to slice the product when the shaft is rotated in said opposite direction and disposed to freely pivot relative to the frame when the shaft is rotated in said first direction.

9. The vat of claim 8, wherein said blade members have generally sharp vertical edges extending in said opposite direction.

10. The vat of claim 8, and including stop means carried by the frame for limiting pivotal movement of said blade members when said shaft is rotated in said opposite direction.

11. The vat of claim 8, and including a connecting member connected to the lower ends of the blade members, said connecting member having a substantially greater horizontal width than vertical thickness.

12. The vat of claim 11, wherein said connecting member has a longitudinal edge portion that extends radially of the shaft, said longitudinal edge portion projecting in said first named direction beyond said blade members.

13. The vat of claim 11, wherein said connecting member has a longitudinal edge portion that extends radially of the shaft, said longitudinal edge portion projecting laterally from the lower ends of the blade members.

* * * * *